(12) United States Patent  
Gardner et al.

(10) Patent No.: US 7,418,050 B1
(45) Date of Patent: Aug. 26, 2008

(54) MIMO MODULATION IN A WIRELESS NETWORK WITH AT LEAST ONE DEGENERATE NODE

(75) Inventors: James Gardner, San Ramon, CA (US); D. J. Richard van Nee, De Meern (NL); Vincent K. Jones, IV, Redwood City, CA (US); Geert Arnout Awater, Utrecht (NL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/376,347

(22) Filed: Feb. 26, 2003

Related U.S. Application Data

(63) Continuation of application No. 10/143,213, filed on May 9, 2002, now abandoned.

(51) Int. Cl.
   *H04L 27/28* (2006.01)
(52) U.S. Cl. ...................................................... 375/265
(58) Field of Classification Search ................. 375/259, 375/260, 262, 130, 140, 141, 265, 299, 295
   See application file for complete search history.

(56) References Cited

U.S. PATENT DOCUMENTS

| | | | | |
|---|---|---|---|---|
| 4,661,993 A * | 4/1987 | Leland et al. | ............... | 455/103 |
| 5,241,563 A * | 8/1993 | Paik et al. | ................... | 375/262 |
| 5,521,937 A * | 5/1996 | Kondo et al. | ................ | 375/144 |
| 5,960,032 A * | 9/1999 | Letaief et al. | ............... | 375/146 |
| 6,269,126 B1 * | 7/2001 | Toskala et al. | .............. | 375/265 |
| 6,446,236 B1 * | 9/2002 | McEwen et al. | ............ | 714/795 |
| 6,470,055 B1 * | 10/2002 | Feher | ......................... | 375/259 |
| 6,556,617 B1 * | 4/2003 | Tsujimoto | ................... | 375/141 |
| 6,721,339 B2 * | 4/2004 | Li et al. | ..................... | 370/535 |
| 6,726,297 B1 * | 4/2004 | Uesugi | ....................... | 375/260 |
| 7,031,371 B1 * | 4/2006 | Lakkis | ........................ | 375/146 |
| 2002/0059551 A1 * | 5/2002 | Alamouti | .................... | 714/792 |
| 2002/0122499 A1 * | 9/2002 | Kannan et al. | ............. | 375/260 |
| 2003/0072452 A1 * | 4/2003 | Mody et al. | .................. | 380/274 |
| 2003/0112745 A1 * | 6/2003 | Zhuang et al. | .............. | 370/208 |
| 2003/0147476 A1 * | 8/2003 | Ma et al. | ..................... | 375/329 |
| 2004/0240378 A1 * | 12/2004 | Kei Ng et al. | ............... | 370/206 |

* cited by examiner

*Primary Examiner*—Kevin M Burd
(74) *Attorney, Agent, or Firm*—Amin, Turocy & Calvin, LLP

(57) ABSTRACT

MIMO modulation is supported in a wireless network with at least one degenerate node. A transmitter separates data into multiple streams for modulation. To transmit the modulated data, the transmitter uses a separate antenna for each data stream or coherently combines the modulated data streams prior to transmission via fewer antenna than modulated data streams. In either case, the received signal includes a contribution from each data stream. A receiver is configured for processing multiple signals sent in parallel from multiple transmit antennas; thus, the operation of the receiver is unaffected by whether the multiple data streams of the transmitter were combined in the channel after transmission or in whole or part in the transmitter prior to transmission.

36 Claims, 5 Drawing Sheets

MIMO MODULATION IN A WIRELESS NETWORK WITH AT LEAST ONE DEGENERATE NODE

CROSS-REFERENCE TO RELATED APPLICATION

This application is a continuation of application Ser. No. 10/143,213, filed May 9, 2002 now abandoned, which disclosure is incorporated herein by reference for all purposes.

BACKGROUND OF THE INVENTION

The invention relates in general to wireless communication networks and in particular to multiple input/multiple output (MIMO) modulation in a network with at least one degenerate node.

Wireless communication networks offer the possibility of convenient access to information from virtually anywhere. In one common model, a wireless local area network (LAN) is provided in which one or more potentially mobile units equipped with wireless network interface cards (NICs) exchange data with an access point (AP) via radio-frequency (RF) or infrared (IR) channels. The AP is connected—generally via a wired, high-speed connection—to a wide area network, intranet, LAN, the Internet, or other network. The NICs and APs use a common communication protocol to regulate the exchange of data. Generally speaking, at the physical level, the communication protocol specifies parameters for accessing the communication channel. Such parameters typically include the carrier frequencies and modulation formats to be used for transmitting data. In addition, the protocol typically provides for training data (i.e., known data sequences) to be transmitted; training data is used by the receiver to correct for channel effects that may lead to errors in reconstructing the transmitted data sequence, including fading and noise in the transmission channel, as well as carrier-frequency and timing offsets between the transmitter and the receiver and multipath effects.

The IEEE 802.11a standard defines one such protocol for data transmission in a wireless LAN using orthogonal frequency division multiplexing (OFDM) in the 5.8-GHz band. According to this standard, data to be transmitted is provided to the transmitter in serial form. Sequential data bits are mapped in groups to a symbol in a constellation; the choice of constellation depends on the desired data rate. To attain the maximum supported data rate of 54 Mbps, each group of six data bits is mapped to a symbol in a 64-point quadrature amplitude modulation (64QAM) constellation. Each symbol is then assigned to one of 48 mutually orthogonal data-carrying subcarrier frequencies; four additional orthogonal subcarrier frequencies are also used and carry pilot symbols. An Inverse Fast Fourier Transform (IFFT) may be used to combine symbol streams from all 52 subcarriers, producing a time-domain signal for transmission. A preamble is transmitted with each data frame. The preamble specifies the data rate (which determines the constellation to be used for decoding) and the length of the data in the frame. The preamble also includes training data needed for synchronization of the receiver with the transmitter and for estimation of channel effects. At the receiver end, the process is reversed. A Fast Fourier Transform (FFT) is performed, and channel effects are removed by using channel estimates generated from the training data. Based on the data rate provided in the preamble, the correct constellation is selected for decoding. Decoding generally involves estimating the most likely symbol sequence by mapping the received data (corrected for channel effects) to points in the constellation.

Compared with wired LANs, wireless LANs offer the advantages of low-cost installation and greater flexibility in relocating components, since it is not necessary to provide cables for connecting the components. However, the data rate in existing wireless LANs (e.g., a maximum of 54 Mbps in an IEEE 802.11a network) is considerably lower than the 100-Mbps rate available in a wired LAN using 100baseT Ethernet, for example. Thus, for networks where high data rates are needed, wired LANs are still preferred. To attain greater acceptance, protocols for wireless LANs that support higher data rates would be desirable.

Various options for IEEE 802.11a extensions that would support higher data rates have been considered. One option is to use multiple channels to transmit the data stream; for example, data could be multiplexed between two 54 Mbps streams occupying two contiguous 20 MHz channels to obtain a rate of 108 Mbps. Using multiple channels, however, would reduce the LAN capacity (i.e., the number of nodes) because each transmitter would require more of the available RF spectrum. Moreover, such schemes may not be permitted under existing telecommunication regulations in some areas (e.g., Europe).

Another option is to increase the constellation density and/or reduce the coding overhead, thereby enabling each symbol to carry more data bits. However, increased constellation density would lead to increased error rates at the receiver end, while reducing the coding overhead would reduce the error-correction information available to the receiver. In either case, the effective operating range of the transmitter would be reduced as compared to IEEE 802.11a specifications. Some of the range could be restored by using diversity techniques, in which replicas of the same signal, displaced in time and/or space, are sent or received. However, diversity techniques require additional antennas at one or both ends of the link, which increases the cost of manufacturing some or all of the network components. Some known techniques (e.g. maximal ratio combining, space-time coding, transform techniques, and adaptive beam-forming) are effective with additional antennas at only one end of the link and would reduce the extra cost associated with diversity techniques. Nevertheless, in order to double the data rate, the constellation density would have to be doubled, and diversity techniques would not fully compensate for the loss of range.

A third option is to use multiple input, multiple output (MIMO) systems to increase the data rate and the operating range without increasing bandwidth. In a MIMO system, a transmitter splits the data into multiple streams and sends each via a separate antenna. The transmitter is designed so that each transmitted data stream has a distinctive vector signature. The receiver, which also has multiple antennas, processes received signals as including components from multiple transmitted streams, based on the differences in vector signatures of the transmitted streams. Unfortunately, existing MIMO systems require all network components to have additional RF chains and antennas, which increases the cost.

Therefore, it would be desirable to provide a system that supported increased data rate and operating range while not requiring additional bandwidth or additional RF chains at every network node (i.e., component unit or AP) or requiring capability knowledge to be shared between every node.

BRIEF SUMMARY OF THE INVENTION

The present invention provides MIMO modulation for a wireless network wherein one or more nodes can be a degenerate node, i.e., at least one transmitter or receiver that has fewer antennas than a nondegenerate node antenna, without requiring modification of nondegenerate nodes. The modulation format is designed so that the transmit and/or receive operations of each network node are unaffected by whether another node is degenerate. In accordance with the present invention, a transmitter separates data into multiple streams for modulation. To transmit the modulated data, the transmitter either uses a separate antenna for each data stream or coherently combines the modulated data streams prior to transmission via fewer antennas than there are data streams (such as a single antenna for a combination of all data streams). In either case, the received signal includes a contribution from each data stream (unless some of the transmit antennas are blocked). A receiver is configured to process a received signal containing contributions from multiple signals sent in parallel from multiple transmit antennas; thus, the operation of the receiver is unaffected by whether the multiple data streams of the transmitter were combined in the channel after transmission or in the transmitter prior to transmission.

According to one aspect of the present invention, in a communication system comprising a plurality of transmitters and receivers configured to transmit and receive data in parallel via a plurality of channels, a process for transmitting data is provided. A data sequence to be transmitted is encoded. The encoded data is then split into a plurality of data streams. Each data stream is independently modulated using, for instance, orthogonal frequency division multiplexing (OFDM) modulation. Some or all of the modulated data streams are then combined to produce an output signal using a combiner within the transmitter, thereby producing an output signal. Where there is only partial degeneracy, more than two modulated data streams are present and they are grouped and combined to result in two or more output signals, but fewer output signals than the number of modulated data streams. The output signal is then (in the full degeneracy case) transmitted using a single antenna. In addition, training data is transmitted, the training data being sufficient to enable the receiver to compute a channel estimate corresponding to each of the plurality of data streams. For instance, a plurality of orthogonal training symbols may be provided.

The encoding of data may use a forward error correction encoding, such as trellis coded modulation (TCM), or another encoding scheme may be used to map data onto complex-valued symbols. Encoding may also include rotating encoded data symbols in the complex plane. After splitting the data, coordinate interleaving may be performed using pseudorandom or periodic interleavers.

Combining the modulated data streams may be performed by scaling a first one of the modulated data streams by a scaling factor, then adding the scaled data stream to a second one of the modulated data streams for one or more output signals. The scaling factor may be a real or complex-valued constant.

According to another aspect of the invention, in a communication system comprising a plurality of transmitters and receivers configured to transmit and receive data in parallel via a plurality of channels, a process for receiving data is provided. A signal is received, the signal including contributions from a plurality of data streams combined in either the channel or the transmitter, the signal further including training data. The signal is demodulated. A plurality of channel estimates is computed from the training data, each channel estimate corresponding to one of the plurality of data streams. A plurality of metrics is computed from the demodulated signal and the plurality of channel estimates, each of the metrics reflecting a contribution to the demodulated signal from a corresponding one of the plurality of data streams. The metrics are used to decode the demodulated signal.

Metrics may be computed by computing a Euclidean distance from a first complex-valued point representing the demodulated signal to a second complex-valued point representing one of a set of possible combinations of transmitted data symbols from the plurality of data streams; repeating the computation of a Euclidean distance for each of the possible combination of transmitted data symbols; and generating the metrics based on a combination in the set of possible combinations of transmitted symbols for which the Euclidean distance is minimized.

According to a further aspect of the invention, a transmitter for transmitting data via a channel is provided. The transmitter includes an encoder configured to encode data to be transmitted; a demultiplexer configured to receive encoded data from the encoder and to split the data into a plurality of data streams; a plurality of modulators each configured to receive a data stream from the demultiplexer and to modulate the received data stream for transmission via the channel; a combiner configured to receive a modulated data stream from each of the plurality of modulators and to coherently combine the modulated data streams prior to transmission, thereby generating one or more output signals; and one or more antenna configured to receive the output signal(s) from the combiner and to pass the output signal(s) into the channel, where the number of output signals is fewer than the number of modulated data streams.

The encoder may comprise a mapping unit configured to map a plurality of sequential data bits onto a plurality of complex-valued data symbols, and a coordinate rotator configured to rotate the complex-valued data symbols. The mapping unit may be configured to use trellis coded modulation or another forward error correction mapping scheme. The complex-valued data symbols may be symbols in a quadrature amplitude modulation constellation.

A plurality of coordinate interleavers may also be provided, each coordinate interleaver configured to receive one of the plurality of data streams from the demultiplexer, to coordinate interleave the received data stream, and to provide interleaved data to one of the modulators.

The modulators may be configured to implement orthogonal frequency division multiplexing modulation. The modulators may be further configured to insert training data into the modulated data stream. The training data may comprise a plurality of orthogonal training symbols.

The combiner may comprise a scaler configured to receive a first modulated signal from a first one of the plurality of modulators and to scale the first signal by a constant scaling factor; and an adder configured to receive the scaled first signal from the scaler and a second signal from a second one of the plurality of modulators, and further configured to add the scaled first signal and the second signal, thereby generating an output signal.

According to a still further aspect of the invention, a receiver for receiving a transmitted signal comprising a plurality of data streams transmitted in parallel via a channel is provided. The receiver comprises an antenna configured to receive the transmitted signal from the channel; a demodulator configured to demodulate the received signal, the demodulator further configured to generate a channel estimate corresponding to each of the plurality of data streams; a metric generator configured to receive the demodulated signals and the channel estimates from the demodulator and to generate a plurality of metrics therefrom; and a decoder configured to receive the plurality of metrics and produce an estimate of the transmitted signal.

The demodulator may be configured to perform orthogonal frequency division multiplexing demodulation. The demodulator may also be configured to generate each channel estimate from training data included in the transmitted signal.

The metric generator may be configured to generate metrics based on a Euclidean distance from a first complex-valued point representing the demodulated signal to a second complex-valued point representing a possible combination of transmitted signals.

One advantage of a degenerate MIMO node is that it can be produced at a lower cost relative to a multi-antenna MIMO node because the degenerate node would require fewer antennas (and their attendant circuitry).

The following detailed description together with the accompanying drawings will provide a better understanding of the nature and advantages of the present invention.

DETAILED DESCRIPTION OF THE INVENTION

The present invention provides MIMO modulation in a wireless network wherein one or more nodes can be a degenerate node, without requiring modification of nondegenerate nodes. In accordance with an embodiment of the present invention, a transmitter separates data into multiple streams for modulation. To transmit the modulated data, the transmitter uses a separate antenna for each data stream, coherently combines the modulated data streams prior to transmission via a single antenna or coherently combines some of the data streams to result in more than one output signal, but fewer than the number of data streams. A receiver is configured to operate as if it were receiving multiple signals from multiple transmit antennas; thus, the operation of the receiver is unaffected by whether the multiple data streams of the transmitter were combined in the channel (i.e., after transmission) or in the transmitter prior to transmission.

Figure 1A:
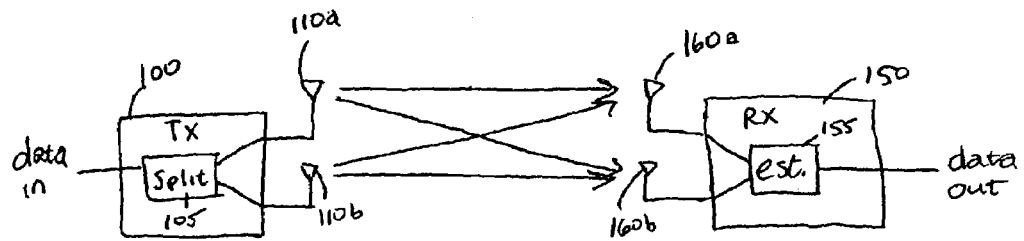
FIGS. 1A-D are simplified block diagrams illustrating an operating principle of the present invention.

FIGS. 1A-D are simplified block diagrams illustrating an operating principle of the present invention. FIG. 1A shows a non-degenerate MIMO transmitter 100 sending signals to a non-degenerate MIMO receiver 150. As used herein, "non-degenerate" refers to a transmitter or receiver that is capable of sending or receiving signals via each of a plurality of antennas (two antennas, in the case shown in FIG. 1) wherein the number of antennas used is at least as many as the number of modulated data streams; an "antenna" refers generally to any apparatus for coupling a transmitter or receiver to a channel and is to be understood as including any associated components such as a standard radio-frequency (RF) chain. Data provided to transmitter 100 is split into two streams by a splitter 105; a first stream is sent via antenna 110a, while the second stream is sent via antenna 110b. In general, antennas 110a, 110b may be identical and separated by at least half the carrier wavelength (about 3 cm for carriers in the 5 GHz band). In other embodiments, antennas of different polarizations may be used to decrease the antenna spacing.

Receiver 150 receives a first signal via antenna 160a and a second signal via antenna 160b. It is to be appreciated that the signal received by antenna 160a may be a combination of the two signals sent by antennas 110a and 110b, and the signal received by antenna 160b may be a combination of the two signals sent by antennas 110a and 110b, as indicated by the arrows between the respective antennas; that is, the two transmitted signals are combined in the channel. Typically, the signals received by antennas 160a, 160b are expected to be different in some way. Receiver 150 includes an estimator unit 155 that decombines the two signals in order to estimate the transmitted data sequence. In the most general case, each receiver antenna receives signals from each transmitter antenna with each path between a given transmitter antenna and a given receiver antenna after being transformed by the channel characteristics associated with that pair. Typically, the receiver antenna receives an additive combination of multiple transmitted signals, one per transmit antenna. In some cases, due to signal blockage, cancellation by reflections, or other causes, the received signal could contain zero contribution from one or more transmitted antenna.

Figure 1B:
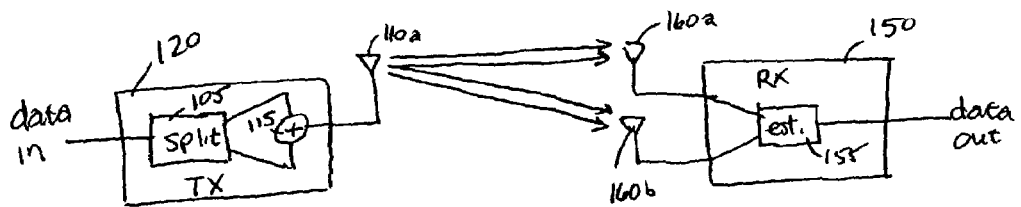

In FIG. 1B, a degenerate MIMO transmitter 120 is shown sending data to receiver 150. Degenerate MIMO transmitter 120 has only one antenna 110a and consequently is not configured to send multiple signals to be combined in the channel. Instead, degenerate transmitter 120 splits data into multiple data streams using splitter 105 and then combines the multiple data streams in combiner 115 prior to transmission via antenna 110a. Antenna 110a then sends a combination of two signals that reaches each receiving antenna 160a, 160b, as indicated by the double arrows between the antennas. The combined signal sent by degenerate transmitter 120 may be processed by receiver 150 in exactly the same manner as signals sent separately by non-degenerate transmitter 100 and combined in the channel. Thus, receiver 150 is able to operate without knowledge of whether the signal was sent by non-degenerate transmitter 100 or by degenerate transmitter 120.

Figure 1C:
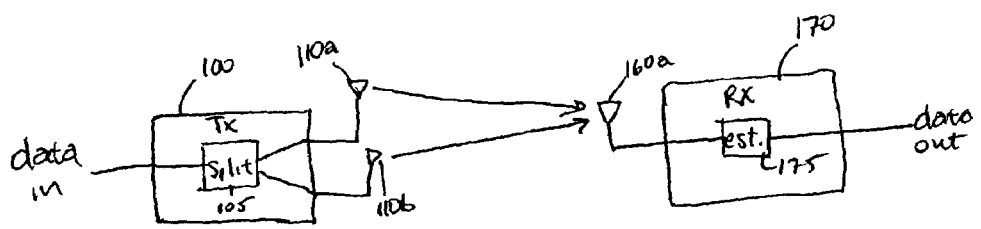
Figure 1D:
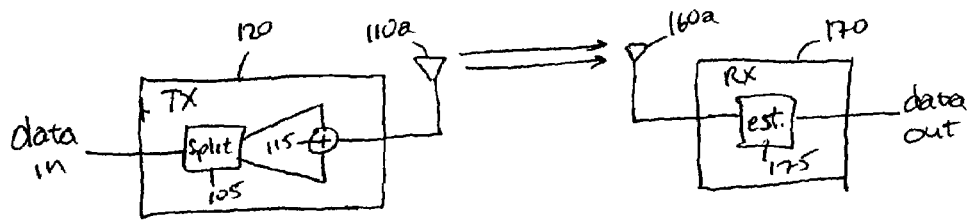

FIGS. 1C and 1D illustrate a similar principle in the case of a degenerate receiver 170 having only one antenna 160a. In FIG. 1C, the signal received at antenna 160a is a combination of the signals sent by antennas 110a, 110b; the combination occurs in the channel. In FIG. 1D, the signal received at antenna 160a is the result of combining signals in degenerate transmitter 120 and transmitting the combined signal. In either case, receiver 170 performs the same decombination functions using an estimator 175 that also estimates the transmitted data sequence.

According to the present invention, a common protocol may be provided for communication between any of the four transmitter-receiver pairs shown in FIGS. 1A-D. That is, transmitter 100 can operate in exactly the same manner in FIG. 1A as it does in FIG. 1C, and transmitter 120 can operate in exactly the same manner in FIG. 1B as it does in FIG. 1D. Likewise, receiver 150 can operate in exactly the same manner in FIG. 1A as it does in FIG. 1B, and receiver 170 can operate in exactly the same manner in FIG. 1C as it does in FIG. 1D. An exemplary protocol will now be described in conjunction with exemplary embodiments of non-degenerate transmitter 100 and degenerate transmitter 120, and of non-degenerate receiver 150 and degenerate receiver 170.

Figure 2A:
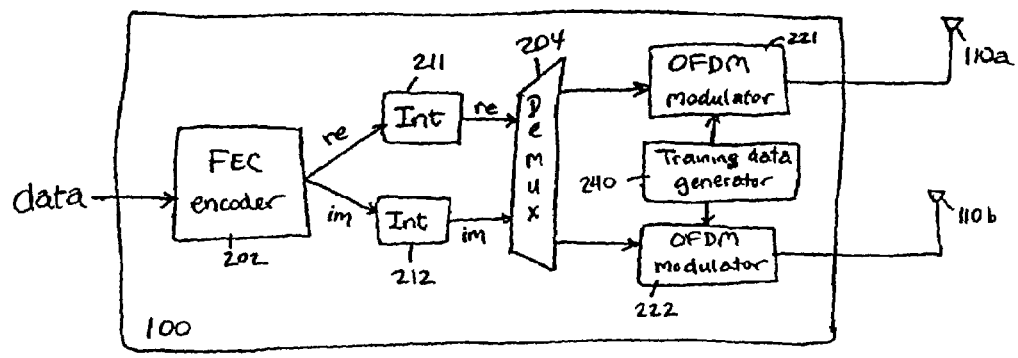
FIGS. 2A-B are simplified block diagrams of alternative exemplary embodiments of transmitters according to the present invention.
Figure 2B:
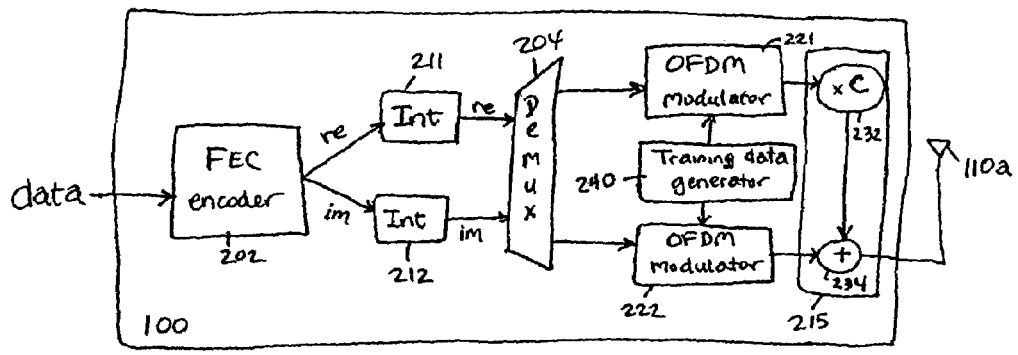

FIGS. 2A-B are functional block diagrams showing the components of non-degenerate transmitter 100 and degenerate transmitter 120, respectively. As shown in the drawings, most of the components of transmitters 100 and 120 are identical, except that degenerate transmitter 120 has a combiner 215, while non-degenerate transmitter 100 has a second antenna 110b.

The transmitter 100, 120 receives a data sequence from a data source (not shown). The data sequence is encoded by a forward error correction (FEC) encoder 202. In an exemplary embodiment, FEC encoder 202 uses trellis coded modulation (TCM), a known modulation and forward-error-correction method, to map 9 data bits onto two consecutive symbols in a 64-point quadrature amplitude modulation (64QAM) constellation, thereby providing a data throughput of 108 Mbps. The exact TCM code to be used is not restricted; in general, codes with 32-128 states based on known Ungerboeck codes may be used.

Optionally, the 64QAM symbols may be rotated by FEC encoder 202 so that the real and imaginary components of the resulting symbols have distinct coordinates; standard constellation rotation techniques may be employed. Constellation rotation allows every symbol in the constellation to be uniquely identified based on either the real or imaginary component.

In alternative embodiments, different encoding schemes, constellations, and/or mappings may be selected. For instance, every four data bits may be mapped onto one 32Cross symbol, where 32Cross is a well-known constellation related to QAM constellations, providing a data throughput of 96 Mbps. In another example, FEC encoder 202 may apply bit-interleaved convolutional coding followed by QAM mapping. Other encoding schemes and symbol constellations will be apparent to one skilled in the art in view of the present disclosure.

The real and imaginary parts of the encoded data symbols are optionally coordinate interleaved using independent interleavers 211, 212. Interleavers 211, 212 may be implemented as standard interleavers of either the pseudorandom or periodic type, with each interleaver 211, 212 initialized to a different value. Coordinate interleaving results in the real and imaginary components of a symbol being transmitted by different carriers. Used in conjunction with constellation rotation (which may be performed by FEC encoder 202 as described above), coordinate interleaving increases the diversity order of the system by providing additional redundancy. Specifically, if the signal from one carrier is not received (due to channel fading), only one of the real and imaginary coordinates of a symbol is lost. The symbol may still be determined based on the other coordinate, which is received from a different carrier that has different fading properties. In an alternative embodiment, where the additional redundancy provided by coordinate interleaving is not desired, interleavers 211, 212 may be omitted.

The interleaved data is passed to a demultiplexer 204, which splits the data stream into multiple streams. In the exemplary embodiment of FIGS. 2A-B, two streams are shown, but a different number of streams may be used. The algorithm used to split the symbol stream is not restricted, provided that the algorithm is known at the receiver end, and any such algorithm employed in existing MIMO systems may be used. For instance, an algorithm that performs periodic splitting may be used.

Each data stream is provided to one of a number of orthogonal frequency division multiplexing (OFDM) modulators 221, 222. Each of OFDM modulators 221, 222, which may be implemented using standard components, performs OFDM modulation using an inverse fast Fourier transform (IFFT), thereby providing a time-domain signal suitable for feeding to an antenna.

In the case of transmitter 100, two antennas 110a, 110b are present. OFDM modulator 221 feeds its output signal to antenna 110a while OFDM modulator 222 feeds its output signal to antenna 110b. In the case of transmitter 120, however, only one antenna 110a is present. Combiner 215 coherently combines the respective outputs of the OFDM modulators 221, 222, feeding the combined output to antenna 110a. In the embodiment shown, combiner 215 includes a scaler 232 and an adder 234. Scaler 232 scales the output of OFDM modulator 221 by a constant scaling factor c. Adder 234 adds the output of scaler 232 to the output of OFDM modulator 222. The value of the scaling factor c is chosen to minimize packet error rate; a value of ½" (e.g., 1, ½, ¼, ⅛) is easily implemented as a bit shift.

It will be appreciated that other scaling factors may also be used. For instance, any complex-valued scaling factor may be used, thereby rotating (instead of or in addition to scaling) the constellation of one data stream relative to the other. In some embodiments, e.g., where coordinate interleaving is not used, a complex-valued scaling factor may improve performance by somewhat increasing the diversity order of the degenerate channel. In another alternative embodiment, both streams are scaled by different (real or complex) scaling factors prior to adding.

In yet another alternative embodiment, the scaling factor c (which may be real or complex) is not a constant but varies with the subcarrier frequency. Frequency-dependent rotation and/or scaling could be implemented, for instance, to maximize performance on a channel in embodiments where the channel response is known at the transmitter. Although such rotation and/or scaling could be performed after modulation by using a filter with a tunable phase and amplitude response in place of scaler 232, a simpler approach is to provide a scaler prior to each modulator that performs the appropriate rotation and/or scaling. The selection of frequency-dependent scaling factors depends in part on the structure of training data that are included in the transmitted data stream, as described below.

It is to be noted that signals received from non-degenerate transmitter 100 and from degenerate transmitter 120 should differ only in where the combination of the output signals from OFDM modulators 221, 222 occurs. For transmitter 100, the output signals are combined in the channel after transmission; for transmitter 120, the output signals are combined in the transmitter prior to entering the channel. From the receiver perspective, this difference is irrelevant to decombining the signals; thus, non-degenerate transmitter 100 and degenerate transmitter 120 are equally capable of communicating with a receiver capable of decombining the signals.

In addition to the data provided by the data source, transmitter 100 or transmitter 120 also sends training data for use by the receiver in estimating channel effects and decombining signals. In general, the training data comprises a sequence of symbols known to the receiver; by comparing the received training signals with the known input sequence, the receiver is able to estimate the channel effects. In the case of transmitter 100, the training data is provided via both antennas 110a, 110b because the channel effects on signals from each antenna are generally different. In the exemplary embodiment shown in FIG. 2A, a training data generator 240 provides a training sequence to be included in the data stream by each OFDM modulator 221, 222. In the case of transmitter 120, training data generator 240 operates in a similar manner so that training sequences are included in both data streams. An IEEE 802.11 standard training sequence or any other training sequence known to the receiver may be generated by training data generator 240. Sequences including orthogonal training symbols may advantageously be used, as described further below. Training data generator 240 may employ known frequency multiplexing or transform techniques to share training data among OFDM modulators 221, 222.

In the case of frequency-dependent rotation and/or scaling, the structure of the training data should affect the selection of rotation and/or scaling factors. For instance, if modulator 221 provides training data only for odd tones, the receiver will estimate the channel response of the channel associated with modulator 221 at the even tones by interpolating between pairs of adjacent odd tones. In this case, the frequency response of the rotation and/or scaling should be smooth so that the interpolation will be accurate.

Figure 3A:
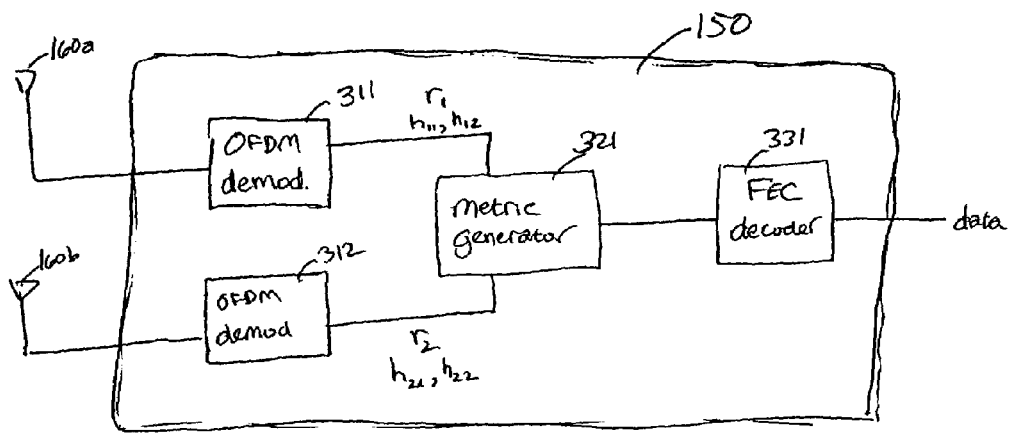
FIGS. 3A-B are simplified block diagrams of alternative exemplary embodiments of receivers according to the present invention.
Figure 3B:
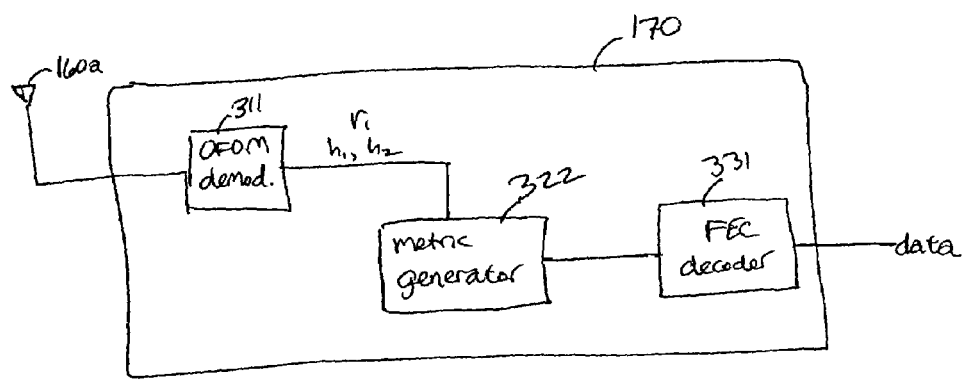

Turning now to the receivers, FIGS. 3A-B are simplified block diagrams illustrating, respectively, exemplary embodiments of a non-degenerate receiver 150 and a degenerate receiver 170. As shown in the drawings, receivers 150 and 170 are generally similar in structure; the differences will be described below.

Antenna 160a receives a signal sent by a transmitter, which may be non-degenerate (e.g., transmitter 100), fully degenerate (e.g., transmitter 120) or partially degenerate. In either case, the received signal is a combination of signals from two independently. OFDM-modulated data streams, as described above with regard to FIGS. 2A-B. In the case of receiver 150, antenna 160b also receives a signal sent by the same transmitter. This second received signal is also a combination of signals from two data streams, as described above with regard to FIGS. 2A-B. One skilled in the art will appreciate that the signals received by antennas 160a and 160b are in general not identical, due to channel effects; however, both signals include contributions from the same two data streams.

For each antenna, the receiver 150, 160 has a corresponding OFDM demodulator. Thus, receiver 150 has a first OFDM demodulator 311 coupled to antenna 160a and a second OFDM demodulator 312 coupled to antenna 160b; receiver 170 has only one OFDM demodulator 311 coupled to antenna 160a. OFDM demodulator 311, which may be implemented using standard components, converts the received time-domain signal from antenna 160a to a frequency-domain signal $r_1$; likewise, OFDM demodulator 312 (in receiver 150 only) converts the received time domain signal from antenna 160b to a frequency-domain signal $r_2$.

Each OFDM demodulator 311, 312 also performs channel estimation using the training symbols included with the data. A channel estimate, generally represented as a complex number $h_i$ for a channel i, must be determined for each transmit/receive pair, on the assumption that two transmit antennas were used. In general, for a known input symbol pair $(z_1, z_2)$ transmitted by two independent transmitters, channel estimates for the two channels are obtained from the formula $r_1 = h_1 z_1 + h_2 z_2$. If the training symbols are orthogonal, then $h_1$ and $h_2$ can be easily determined. Thus, in receiver 150, OFDM demodulator 311 determines two channel estimates $(h_{11}, h_{12})$ for signals received via antenna 160a, and OFDM demodulator 312 determines two channel estimates $(h_{21}, h_{22})$ for signals received via antenna 160b. In receiver 170, OFDM demodulator 311 determines two channel estimates $(h_1, h_2)$ for signals received via antenna 160a. Regardless of whether one or two transmit antennas were used to send the signal, each of OFDM demodulators 311, 312 will be able to generate two channel estimates as long as the transmitted signal includes at least two orthogonal training symbols. A number of ways of providing orthogonal training symbols are known in the art; for instance, standard MIMO training sequences and corresponding techniques for generating channel estimates may be used.

It is to be noted that if only one transmit antenna was used, the two channel estimates computed by a particular demodulator will generally be related; for instance, for signals received from transmitter 120, one of the channel estimates will be approximately c times the other, where c is the scaling factor described above. Since there is channel training data in each stream, the relationship between the two streams can be determined during channel estimation. However, any such relationship between the channel estimates may be ignored by the receiver, and the receiver need not have knowledge of the value of c.

In the case of receiver 150, the demodulated (frequency-domain) signals $(r_1, r_2)$ and the channel estimates $(h_{11}, h_{12}, h_{21}, h_{22})$ from OFDM demodulators 311, 312 are passed to a metric generator 321. Metric generator 321 uses the channel estimates and the demodulated signals provided by OFDM demodulators 311, 312 to generate two metrics. Two metrics are preferred because each tone is a function of two transmit symbol streams, combined either in the channel (in the case of transmitter 100) or by the transmitter (in the case of transmitter 120). One method of metric generation uses the minimum Euclidean distance to the most probable transmitted symbol pair $(x_1, x_2)$:

$$\min_x (R - HX)^+ \Lambda^{-1} (R - HX),$$

where R is the vector $(r_1, r_2)$ of received signals, H is the 2×2 matrix of channel estimates, X is the vector $(x_1, x_2)$ of transmitted symbols, and $\Lambda$ is a noise and interference covariance matrix. The minimum is taken over all possible pairs $(x_1, x_2)$. Generation of the metric may proceed according to standard MIMO techniques. The matrix $\Lambda$ may be generated using known methods of interference estimation. In some embodiments, the interference matrix is not generated, in which case $\Lambda$ is set equal to the identity matrix, and the expression for the minimum Euclidean distance reduces to:

$$\min_x \|R - HX\|^2.$$

In the case of receiver 170, the demodulated signals $(r_1)$ and channel estimates $(h_1, h_2)$ from OFDM demodulator 311 are passed to a metric generator 322. Like metric generator 321, metric generator 322 uses the channel estimates and the demodulated signals provided by OFDM demodulator 311 to generate two metrics. For example, metric generator 322 may use the same Euclidean distance algorithm as metric generator 321, the only difference being that R is a 1×1 vector and H is a 1×2 matrix.

The metrics generated by metric generator 321 or 322 are passed to an FEC decoder 331, which decodes the symbol streams. FEC decoder 331 may be implemented using standard components and algorithms matched to the encoding scheme used by the transmitter. In general, FEC decoder 331 may also perform a deinterleaving function to remove the effects of interleaving in the transmitter; examples of such functions are known in the art. FEC decoder 331 thus provides an estimate of the original data sequence to downstream components (not shown). FEC decoder 331 may be implemented using standard techniques and components.

Thus, in the embodiments described above, a MIMO network is supported in which either a transmitter or a receiver (or both) may be fully degenerate (i.e., have just one antenna). The same MIMO modulation format is used for data transmission in any case. In a non-degenerate system (e.g., FIG. 1A), all the benefits of MIMO may be obtained, notably increased spectral efficiency (and thus, increased data rate) without increasing the required bandwidth or constellation density and without decreasing the operating range. In the singly degenerate cases (e.g., FIGS. 1B and 1C), diversity gain is provided because each symbol is transmitted to the receiver via multiple independently fading paths. In the doubly degenerate case (FIG. 1D), operation is still possible, and performance is comparable to a single input, single output system with an increased constellation density. In all cases, the transmitter is capable of operating without knowledge of the receiver's configuration, and vice versa.

Figure 4:
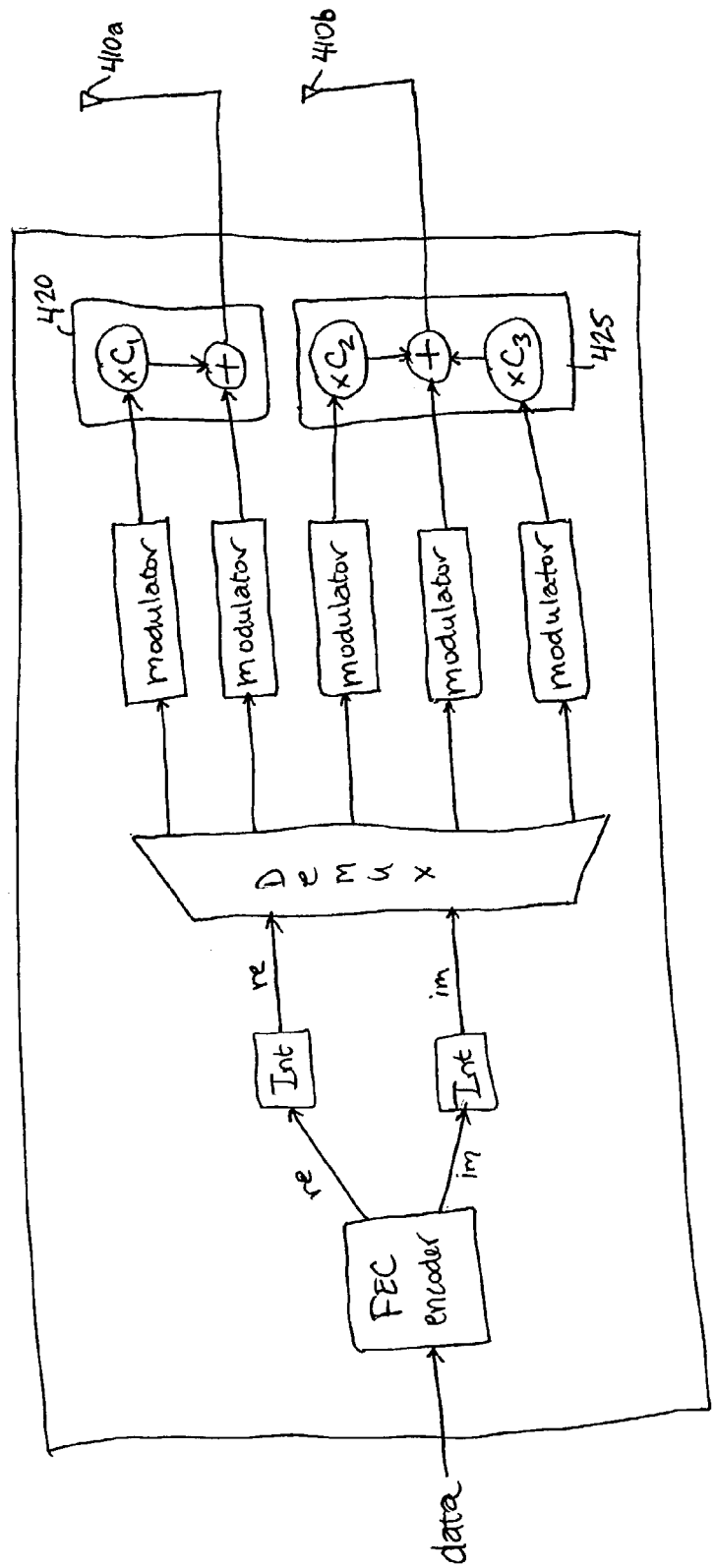
FIG. 4 is a simplified block diagram of an exemplary embodiment of a partially degenerate transmitter according to the present invention.

It should be understood that a transmitter or receiver could have more than one antenna and still be considered a degenerate node. For example, a partially degenerate transmitter 400 for a 5-transmit MIMO network is shown in FIG. 4. Five modulated data streams are present, but they are neither sent from five antennas (a nondegenerate node) nor from one antenna (a fully degenerate node). Instead, two of the streams "degenerate" to one antenna 410a and the other three streams "degenerate" to the other antenna 410b. As with a fully degenerate node, a receiver can interact with a partially degenerate node's transmitter without knowledge of how many antennas were actually used.

Figure 5:
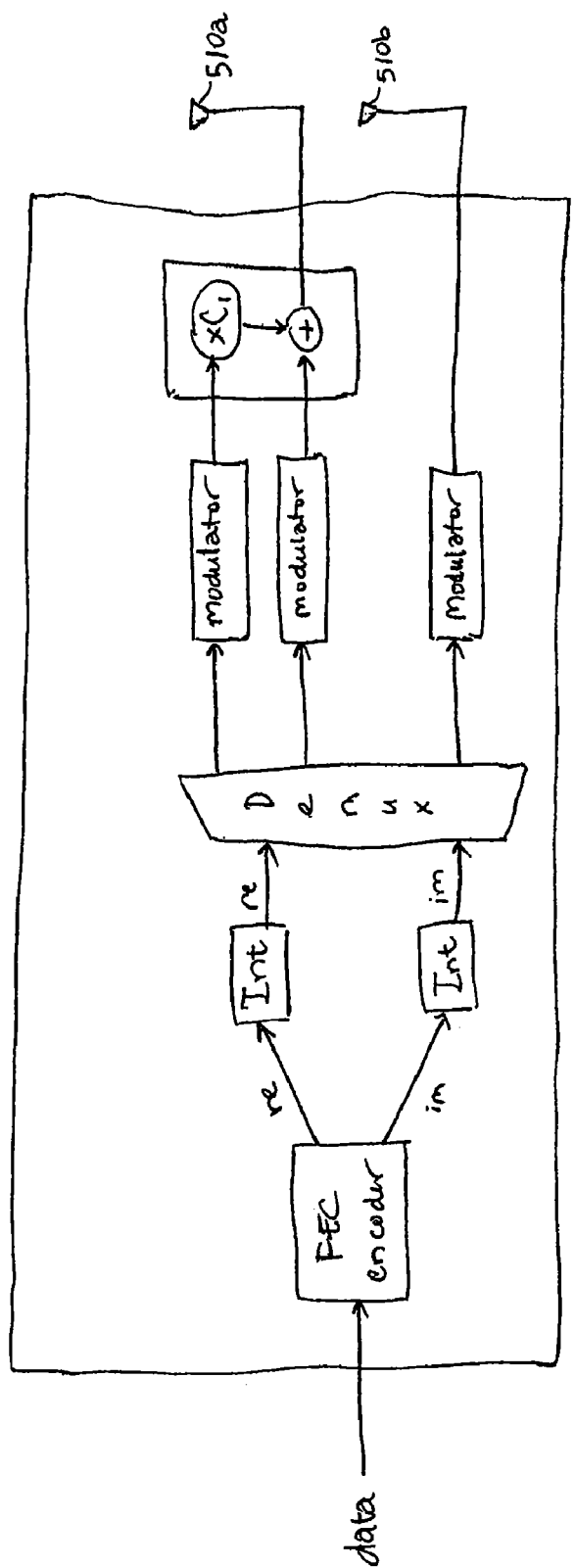
FIG. 5 is a simplified block diagram of another exemplary embodiment of a partially degenerate transmitter according to the present invention.

The combiners 420, 425 of a partially degenerate node, typically one per output signal can apply different values of the scaling factor to different streams. For instance, the scaling factors $c_1$, $c_2$, $c_3$ indicated in FIG. 4 may have different values. The number of combiners does not have to equal the number of output signals, as some output signals might support single data streams, as shown in FIG. 5, in which antenna 510a transmits two combined data streams while antenna 510b transmits a single data stream.

While the invention has been described with respect to exemplary embodiments, one skilled in the art will recognize that numerous modifications are possible. For example, while the networks described herein are based on two-transmit/two-receive MIMO systems with one or more degenerate nodes, one skilled in the art will be able to generalize to n-transmit/n-receive MIMO systems for an arbitrary integer n with one or more fully degenerate (i.e., one-transmit and/or one-receive) nodes and/or one or more partially degenerate nodes (i.e., fewer antennas than modulated data streams). Moreover, the foregoing disclosure may be used to implement a combined transmitter/receiver unit, in which one or more components are configured to perform both transmit and receive functions.

The present invention may also be implemented in a network wherein the transmitter and receiver are able to associate—i.e., where the transmitter and/or receiver is able to obtain information as to the other's antenna configuration. For instance, a two-antenna transmitter may be implemented to use MIMO modulation as described above when it has not determined the receiver's configuration, and to switch to a beam-forming modulation when it has determined that the receiver has only one antenna. Where transmitter antenna configuration is available, a metric generator might use that information to limit a search process, e.g., by constraining channel estimates to be equal when it is known that the streams were combined prior to the channel.

In addition, the various components described herein may be implemented using digital signal processors singly or in combination, or any other combination of hardware and/or software components.

Thus, although the invention has been described with respect to exemplary embodiments, it will be appreciated that the invention is intended to cover all modifications and equivalents within the scope of the following claims.

What is claimed is:

1. In a MIMO communication system having a multiplicity M where M is at least three, the multiplicity of a communication system being the number of overlapping data streams transmitted into a channel of the communication system, a process for transmitting data using fewer than M antennas, the process comprising:
   encoding a data sequence to be transmitted;
   splitting the encoded data into a plurality of data streams corresponding to the multiplicity M;
   independently modulating each of the M data streams;
   combining, in digital form, at least two of the M modulated data streams using a combiner within the transmitter that emulates combining of the at least two modulated data streams in the channel of the MIMO communication system, thereby producing a first output signal, wherein the act of combining includes combining fewer than all of the modulated data streams;
   transmitting a MIMO signal, including converting the first output signal to a first radio frequency (RF) signal and transmitting the first RF signal using a single antenna, wherein the act of transmitting further includes in parallel with transmitting the first RF signal, transmitting one of the uncombined modulated data streams as a second RF signal using a second antenna; and
   transmitting, in the M data streams, training data sufficient to enable the receiver to compute a channel estimate corresponding to each of the M data streams.

2. The process of claim 1, wherein encoding the data sequence comprises using a forward error correction encoding scheme.

3. The process of claim 2, wherein the forward error correction encoding scheme is a trellis coded modulation scheme.

4. The process of claim 3, wherein the trellis coded modulation scheme maps a plurality of data bits onto a complex-valued symbol in a quadrature amplitude modulation constellation.

5. The process of claim 4, wherein encoding the data sequence further comprises rotating the complex-valued symbol.

6. The process of claim 1, further comprising coordinate-interleaving the encoded data prior to splitting the encoded data.

7. The process of claim 6, wherein the coordinate interleaving is performed using a plurality of pseudorandom interleavers.

8. The process of claim 6, wherein the coordinate interleaving is performed using a plurality of periodic interleavers.

9. The process of claim 1, wherein independently modulating each of the M data streams comprises independently performing orthogonal frequency division multiplexing modulation on each of the M data streams.

10. The process of claim 9, further comprising scaling at least one of the data streams by a scaling factor prior to independently modulating that one of the data streams, wherein the scaling factor has a value that is a function of subcarrier frequency.

11. The process of claim 10, wherein the value is a complex value.

12. The process of claim 1, wherein combining more than one of the modulated data streams comprises:
   scaling a first one of the modulated data streams by a first scaling factor not equal to 1; and
   adding the scaled data stream to a second one of the at least two modulated data streams.

13. The process of claim 12, wherein the first scaling factor has a constant value.

14. The process of claim 13, wherein the constant value is a complex value.

15. The process of claim 12, wherein the first scaling factor has a frequency-dependent value.

16. The process of claim 12, further comprising scaling a third one of the modulated data streams by a second scaling factor not equal to 1, wherein the first and second scaling factors have different values.

17. The process of claim 1, wherein all of the plurality of modulated data streams are combined using the combiner into one output signal.

18. The process of claim 1, wherein the training data comprises a plurality of orthogonal training symbols.

19. The process of claim 1, wherein independently modulating each of the M data streams includes modulating at least some of the M data streams with non-orthogonal carriers.

20. The process of claim 1, wherein combining more than one of the modulated data streams includes emulating a channel variation among the data streams being combined.

21. The method of claim 1, wherein all of the plurality of modulated data streams are grouped and combined using a plurality of combiners into more than one output signal but fewer output signals than the multiplicity M.

22. A transmitter for transmitting data in a MIMO communication system having a multiplicity M where M is at least three, the multiplicity of a communication system being the number of overlapping data streams transmitted into a channel of the communication system, the transmitter comprising:
   an encoder configured to encode data to be transmitted;
   a demultiplexer configured to receive encoded data from the encoder and to split the data into a plurality of data streams corresponding to the multiplicity M;
   a plurality of M modulators each configured to receive one of the M data streams from the demultiplexer and to modulate the received data stream independently of the other modulators;
   a combiner configured to receive the respective modulated data streams from at least two of the plurality of modulators and to coherently combine, in digital form, the received modulated data streams prior to transmission so as to emulate combining of the received modulated data streams in the channel of the MIMO communication system, thereby generating an output signal, wherein the combiner combines fewer than all of the modulated data streams; and
   a number $N_T$ of antennas, one of the $N_T$ antennas being configured to receive the output signal from the combiner, to convert the output signal to a radio frequency (RF) signal and to pass the RF signal into the channel of the MIMO communication system wherein a second of the $N_T$ antennas being configured to transmit one of the uncombined modulated data streams as a second RF signal using a second antenna in parallel with converting the output signal to an RF signal,
   wherein the number $N_T$ is less than the multiplicity M.

23. The transmitter of claim 22, wherein the encoder comprises:
   a mapping unit configured to map a plurality of sequential data bits onto a plurality of complex-valued data symbols; and
   a coordinate rotator configured to rotate the complex-valued data symbols.

24. The transmitter of claim 22, wherein the mapping unit is configured to use trellis coded modulation.

25. The transmitter of claim 24, wherein the trellis coded modulation maps data bits to symbols in a quadrature amplitude modulation constellation.

26. The transmitter of claim 22, further comprising:
   a plurality of coordinate interleavers, each configured to receive a component of encoded data from the encoder, to coordinate interleave the received data, and to provide interleaved data to the demultiplexer.

27. The transmitter of claim 22, wherein each of the modulators is configured to implement orthogonal frequency division multiplexing modulation.

28. The transmitter of claim 22, further comprising a training data generator configured to provide training data to each of the modulators.

29. The transmitter of claim 28, wherein the training data comprises a plurality of orthogonal training symbols.

30. The transmitter of claim 22, wherein the combiner comprises:
   a scaler configured to receive a first modulated data stream from a first one of the plurality of modulators and to scale the first modulated data stream by a scaling factor different from 1; and
   an adder configured to receive the scaled data stream from the scaler and a second modulated data stream from a second one of the plurality of modulators, and further configured to add the scaled data stream and the second modulated data stream, thereby generating the output signal.

31. The transmitter of claim 22, wherein all of the M modulated data streams are combined using the combiner into one output signal.

32. The transmitter of claim 31, wherein each of the M modulated data streams is scaled by a different scaling factor prior to combining all of the M modulated data streams into one output signal.

33. The transmitter of claim 22, wherein the number $N_T$ is less than the multiplicity M and wherein all of the M data streams are grouped and combined using a plurality of combiners into more than one output signal but fewer than M output signals and wherein each of the output signals is transmitted using a different one of the $N_T$ antennas.

34. In a MIMO communication system having a multiplicity M where M is at least three, the multiplicity of a communication system being the number of overlapping data streams transmitted into a channel of the communication system, a process for transmitting data using fewer than M antennas, the process comprising:
   encoding a data sequence to be transmitted;
   splitting the encoded data into a plurality of data streams corresponding to the multiplicity M;
   independently modulating each of the M data streams;
   modifying a first one of the M data streams;
   combining the modified first one of the M data streams with at least a second one of the M data streams using a digital combiner within the transmitter, thereby producing a first output signal, wherein the act of combining includes combining fewer than all of the modulated data streams;

transmitting a MIMO signal, including converting the first output signal to a first radio frequency (RF) signal and transmitting the first RF signal using a single antenna, wherein the act of transmitting further includes in parallel with transmitting the first RF signal, transmitting one of the uncombined modulated data streams as a second RF signal using a second antenna; and transmitting, in the M data streams, training data sufficient to enable the receiver to compute a channel estimate corresponding to each of the M data streams.

35. The process of claim 34, further comprising:

modifying the second one of the M data streams prior to the act of combining.

36. A transmitter for transmitting data in a MIMO communication system having a multiplicity M where M is at least three, the multiplicity of a communication system being the number of overlapping data streams transmitted into a channel of the communication system, the transmitter comprising:

an encoder configured to encode data to be transmitted;

a demultiplexer configured to receive encoded data from the encoder and to split the data into a plurality of data streams corresponding to the multiplicity M;

a plurality of M modulators each configured to receive one of the M data streams from the demultiplexer and to modulate the received data stream independently of the other modulators;

a combiner configured to modify at least one of the modulated data streams and to coherently combine, in digital form, the modified data stream with at least one other of the modulated data streams prior to transmission, thereby generating an output signal, wherein the combiner combines fewer than all of the modulated data streams; and a number $N_T$ of antennas, one of the $N_T$ antennas being configured to receive the output signal from the combiner, to convert the output signal to a radio frequency (RF) signal, and to pass the RF signal into the communication channel of the MIMO communication system, wherein a second of the $N_T$ antennas being configured to transmit one of the uncombined modulated data streams as a second RF signal using a second antenna in parallel with converting the output signal to an RF signal, wherein the number $N_T$ is less than the multiplicity M.

* * * * *